UNITED STATES PATENT OFFICE.

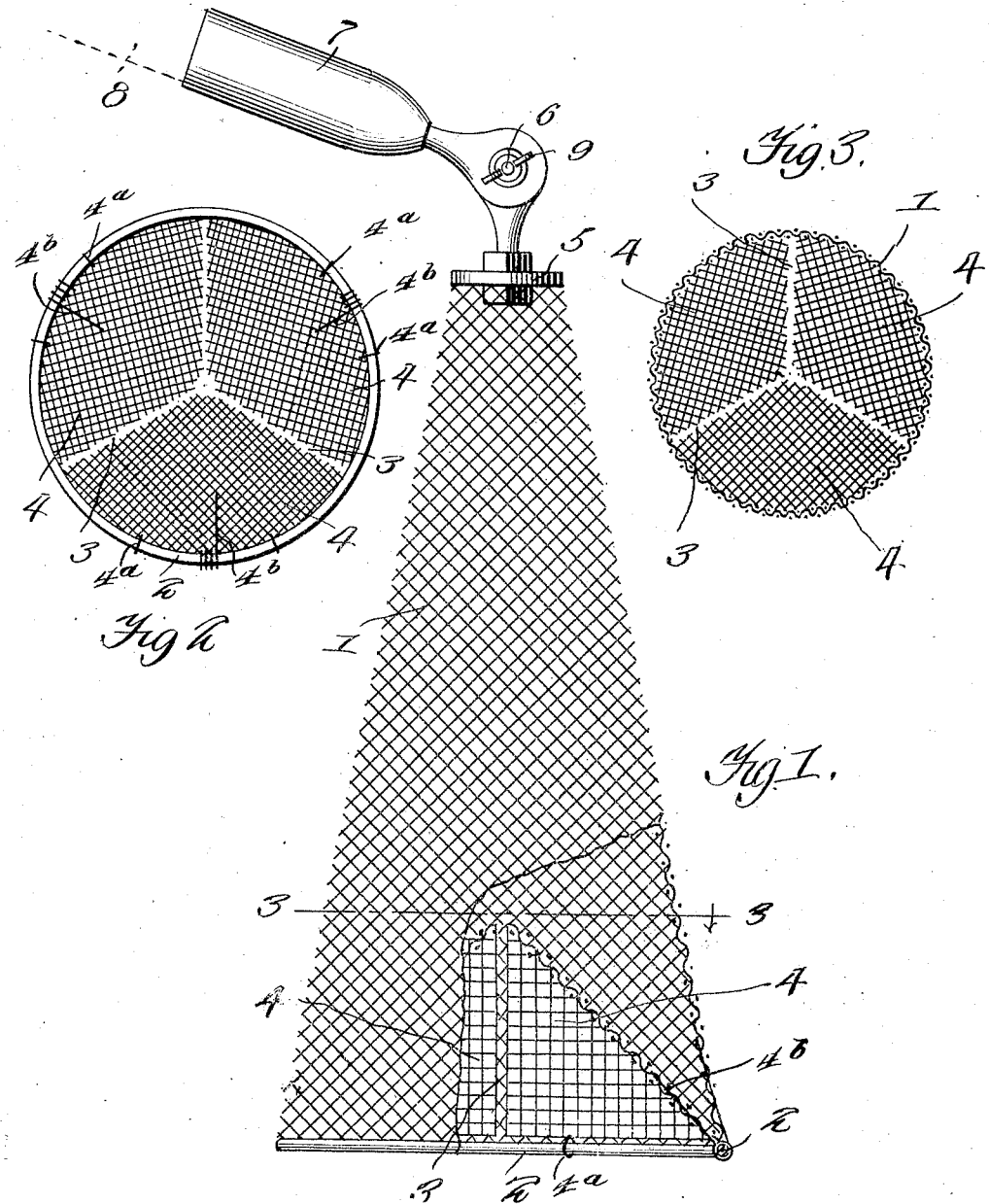

CHARLES M. SUCK, OF CLARKSBURG, WEST VIRGINIA, ASSIGNOR OF ONE-HALF TO J. W. WORLEY, OF SALEM, WEST VIRGINIA.

FROG-TRAP.

998,429.  Specification of Letters Patent.  Patented July 18, 1911.

Application filed August 27, 1909. Serial No. 514,950.

*To all whom it may concern:*

Be it known that I, CHARLES M. SUCK, a citizen of the United States, residing at Clarksburg, in the county of Harrison and State of West Virginia, have invented new and useful Improvements in Frog-Traps, of which the following is a specification.

This invention relates to frog traps, the object of the invention being to provide a simple and effective device by which frogs may be caught alive, allowing them to be shipped to the market in such condition.

The invention consists of the features of construction, combination and arrangement of parts hereinafter fully described and claimed, reference being had to the accompanying drawing, in which:—

Figure 1 is a side elevation, partially in section, of a frog trap embodying my invention. Fig. 2 is a bottom plan view. Fig. 3 is a cross section on line 3—3 of Fig. 1.

1 designates the funnel-shaped body of the trap, which is preferably made of wire, its lower enlarged end or mouth being provided with a reinforcing rim 2. The mouth has a conical chamber or entrance 3 formed by a similarly shaped door or gate composed of a series of radially swinging sections 4, each of said sections being hinged or pivoted at its base to the rim 2 as at 4ª, and also connected to said rim by a spring 4ᵇ, said spring being adapted to permit the door section to open and, in connection with the force of gravity, to return said door section to closed position.

A head 5 is fixed to the upper reduced end of the body and has pivoted thereto, as by a bolt 6, a socket 7 adapted to receive the end of a comparatively long manipulating handle 8. A nut 9 on the bolt adapts the handle to be fastened at a desired angle to the body.

In use, the operator, standing at a distance from the frog, manipulates the handle to place the trap body over the frog, so that the latter will be caught in the entrance 3. The frog, in endeavoring to escape, will jump up into the trap body, from which he may be removed alive, the door s tions opening to permit of his passage and then automatically closing to prevent his escape.

Frogs are usually gigged or shot, whereby they are filled with holes and quickly die and must be shipped on ice or in a refrigerator for preservation. My invention enables them to be caught and shipped alive and kept in such condition until wanted for the table.

I claim:—

A frog trap comprising a vertically disposed conical body forming a trap chamber and having its enlarged end at its base, an annular rim reinforcing said base, a cap closing the upper reduced end of the body, a manipulating handle connected with said cap, a cone-shaped mouth normally closing the lower end of said trap chamber and formed of a plurality of doors each having the shape of a part of the surface of a cone and hinged to the reinforcing rim and extending therefrom upwardly into the body, said doors being adapted to swing upwardly and outwardly under pressure from an entrapped frog within said mouth for the passage of the frog into said trap chamber, and springs connecting said doors with the reinforcing rim and operating to normally hold the doors closed.

In testimony whereof I affix my signature in presence of two witnesses.

CHARLES M. SUCK.

Witnesses:
CARL LYON,
ELLIS LYON.